United States Patent
Yang et al.

(10) Patent No.: US 6,263,253 B1
(45) Date of Patent: Jul. 17, 2001

(54) METHOD FOR ALLOCATING BOTTLENECK RESOURCES

(75) Inventors: Tai-Yi Yang, Pingtung; Yu-Feng Huang, Tainan; Wen-Yao Chen, Hsinchu, all of (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 0 days.

(21) Appl. No.: 09/199,046

(22) Filed: Nov. 24, 1998

(51) Int. Cl.[7] .................................................. G06F 19/00
(52) U.S. Cl. ............................................. 700/99; 700/100
(58) Field of Search ................................ 700/99, 100, 101, 700/102, 103, 171, 173, 174

(56) References Cited

U.S. PATENT DOCUMENTS

| | | | |
|---|---|---|---|
| 5,408,663 | * 4/1995 | Miller et al. | 709/104 |
| 5,841,677 | * 11/1998 | Yang et al. | 700/176 |
| 5,946,212 | * 8/1999 | Bermon et al. | 700/97 |
| 6,092,000 | * 7/2000 | Kuo et al. | 700/115 |

* cited by examiner

*Primary Examiner*—William Grant
*Assistant Examiner*—Chad Rapp
(74) *Attorney, Agent, or Firm*—Nath & Associates PLLC; Harold L. Novick

(57) ABSTRACT

The present invention discloses an allocation method for establishing a theoretical dispatching model for dynamically allocating the bottleneck resource according to the on-line current data. At first, the on-line current data are obtained from the bottleneck resource and those tools next to the bottleneck resource. Decision parameters such as the remaining processing time, buffer WIP of the tools next to bottleneck resource are sequentially derived by using the current data. Each tool next to the bottleneck resource is then determined to receive additional lots from the bottleneck resource or not. Finally, the bottleneck resource is reallocated to those tools that requires the lots from the bottleneck resource.

8 Claims, 4 Drawing Sheets

| Next Tool | Ni | Pi | Bi | Tpi | Tji | Wwi | Wbi | Wbi' | Wci | Wbi" | Ni |
|---|---|---|---|---|---|---|---|---|---|---|---|
| SACVD | 8 | 14 | 1 | 1.5 | 0.2 | 218 | 62 | 62 | 308 | 62 | 2 |
| COATER | 5 | 28 | 1 | 0.7 | 0.2 | 24 | 214 | 214 | 168 | 168 | 4 |
| RTP | 3 | 50 | 1 | 0.3 | 0.2 | 227 | -32 | 0 | 144 | 0 | 0 |
| PHOTO | 4 | 38 | 1 | 0.5 | 0.1 | 275 | -47 | 0 | 191 | 0 | 0 |

FIG.3

METHOD FOR ALLOCATING BOTTLENECK RESOURCES

BACKGROUND OF THE INVENTION

1. Field of the Invention

The invention relates to a method for enhancing the allocation efficiencies of the bottleneck resources, and more particularly, to a method for dynamically allocating the bottleneck resources by increasing the total moves and reducing the lost time for all tools next to the bottleneck resources.

2. Description of the Prior Art

Nowadays, single manufacturing line never satisfies the desires of the modern factory, which implies that a modern factory should manufacture various products to achieve the purpose of decreasing risks and increasing profits. It is a common sense that each tool of the factory can be employed to manufacture at least one product. Therefore, it is important for the factory to control the stream flow when dispatching lots to the consecutive tools.

To establish an ideal dispatching model becomes a widespread discussed issue in the present days. However, it is difficult to construct such a model that achieves the requirements of the modern factory. One critical issue for achieving the aforementioned requirements is how to properly allocate the bottleneck resources. Therefore, there is still no theoretical dispatching model that provides information representative of whether the bottleneck resource has been properly allocated based on on-line current data. Conventional approaches for allocating the bottleneck resources is just to assume those tools next to the bottleneck resource have balance loading. In the semiconductor fabs, the manufacturing lines are rarely balanced especially in there ramp-up period. It is evident that the bottleneck resource may stock many lots waiting for processing, which indicates the capacities of the fabs can be significantly degraded.

Please refer to FIG. 4, which shows a block diagram representative of another bottleneck is arisen when an improper resource allocation is employed at the bottleneck resource in a semiconductor fab. For example, the bottleneck tools 401 of the semiconductor foundry fab are usually PEOX machines. Tools 1~4 indicate those tools next to the bottleneck tool 401, such as the RTA, SACVD, and COATER machines etc. Sometimes, some of the tools 1~4 may be starving when they have no lots (e.g., Wafer-In-Process, WIP) for processing if the bottleneck tools 401 are not allocated properly. Another bottleneck next to the tools 1~4 will thus be arisen because there is no lots for performing the consecutive processes, too. A need has been arisen to disclose a method that suggests a theoretical model for allocating the bottleneck resources in accordance with the on-line data, in which the above-mentioned disadvantages such as the lost time of the tools can be minimized.

SUMMARY OF THE INVENTION

It is an object of the invention to provide an allocation method for a factory to optimally allocate the bottleneck resources.

The other object of the invention is the provision of the allocation method that improves the cycle time of the products and thus increases the factory capacities.

It is a further object of the invention to provide the allocation method to improve the utilization of all machines.

Accordingly to the above purposes, the method disclosed in the present invention establishes a theoretical model for dynamically allocating the bottleneck resource according to the on-line current data. At first, the current data are downloaded from the bottleneck resource and the tools next to the bottleneck resource (next tools). The on-line current data basically encompasses a total number of the next tools; a total number of the bottleneck tools; a total number of the WIP ready for processed by the one of the next tools; the number of the WIP that are going to dispatch to the next tools and currently processed in the bottleneck tools; the batch sizes, the average processing time, and the average throughputs of the next tools. Decision parameters such as the remaining processing time and buffer WIP of the tools next to bottleneck resource are sequentially derived by using the current data. Each tool next to the bottleneck resource is then determined to receive additional lots from the bottleneck resource or not. Finally, the bottleneck resource is reallocated to those tools that requires the lots from the bottleneck resource.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 3 demonstrates a table that listing all the downloaded and computed parameters in the block 102 by using an example of the semiconductor fab.

DESCRIPTION OF THE PREFERRED EMBODIMENT

Figure 1:
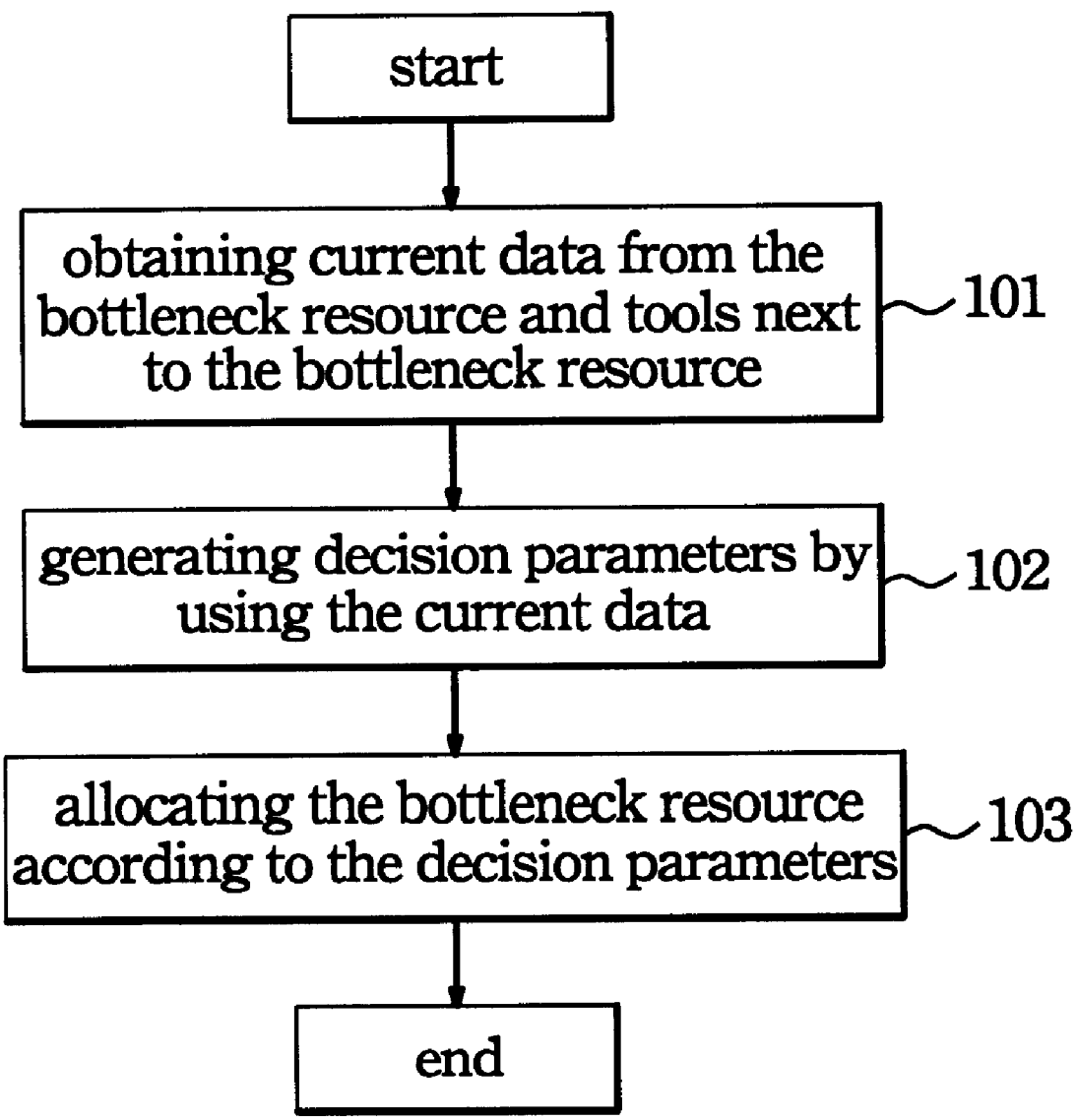
FIG. 1 demonstrates a flow diagram representative of the method that allocating the bottleneck resource according to the invention.

FIG. 1 depicts a flow chart representative of the method for allocating the bottleneck resource in the invention. In the block 101, the on-line current data are downloaded, such as the total numbers of the bottleneck tools and those tools next to the bottleneck tools ("next tools" for short hereinafter); a total number of the WIP ready for processed by one of the next tools; a total number of the WIP that are going to dispatch to the next tools and currently processed in the bottleneck tools; and the batch sizes, the average processing time, and the average throughputs of the next tools. Then, in the block 102, decision parameters such as the remaining processing time and the buffer WIP of the next tools are sequentially derived by using the current data. The bottleneck resource can be reallocated according to the decision parameters in the block 103. As noted, the above steps can be performed when the supervisor wants to monitor the current situations of the bottleneck resource.

Figure 2:
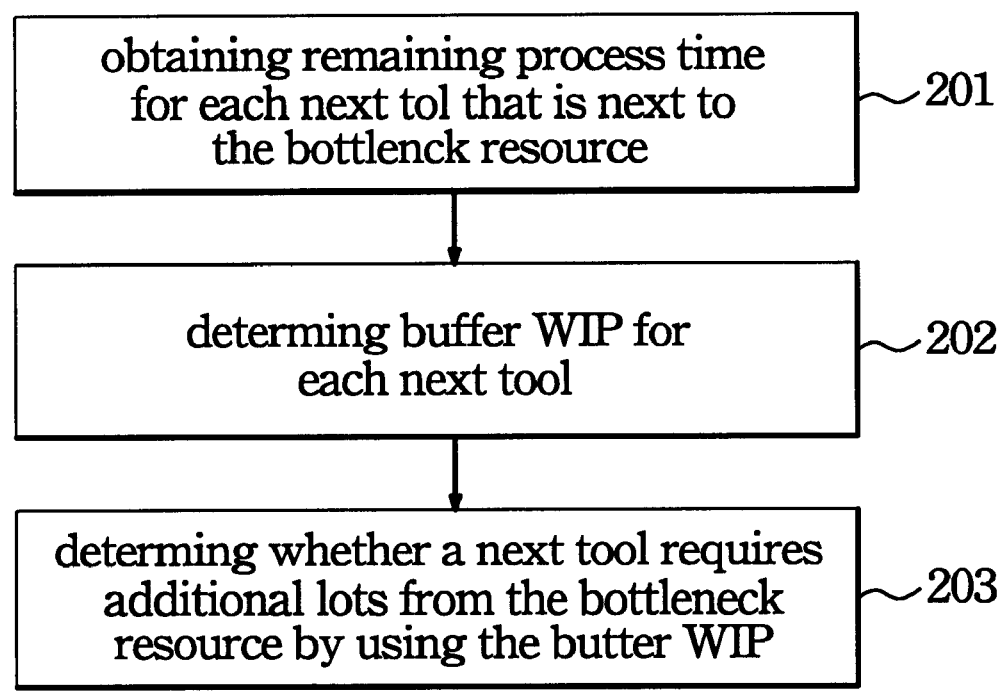
FIG. 2 demonstrates a flow diagram illustrative of the detail steps of the block 102 in the FIG. 1.
Figure 4:
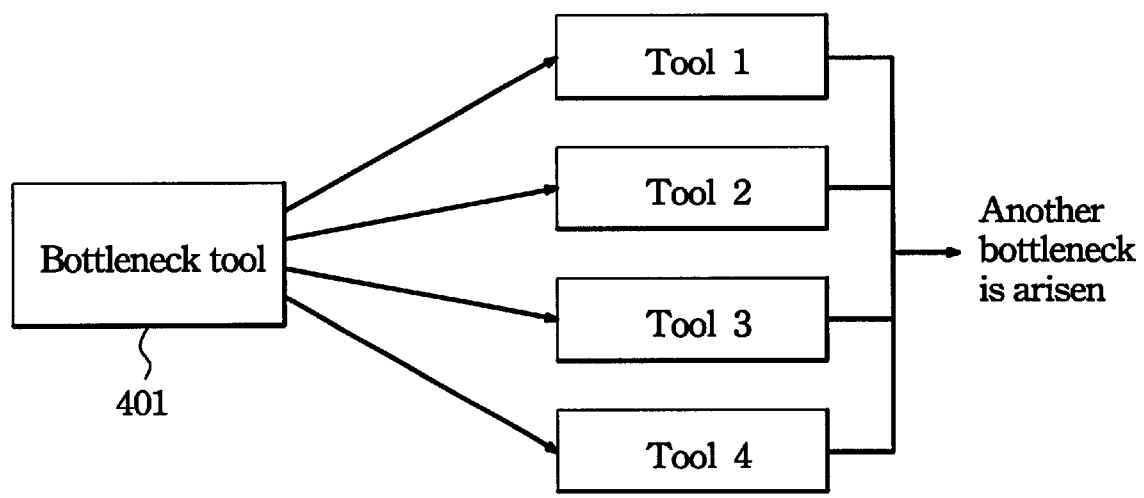
FIG. 4 demonstrates a block diagram illustrative of when another bottleneck is arisen in a semiconductor fab if an improper resource allocation at the bottleneck resource is applied conventionally.

The detail steps of the block 102 are illustrated by using the flow diagram of the FIG. 2. At first in the block 201, the remaining processing time of each next tool is obtained. In the preferred embodiment, the remaining processing time ($T_{ji}$) is computed by the following equation:

$$T_{ji} = (24/P_i) - T_{pi} \qquad \text{(Equation. 1)}$$

wherein $P_i$ indicates the average throughput (per hour) of the ith next tool, and $T_{pi}$ indicates the average processing time of the ith next tool. The numerical number 24 indicate 24 WIP included in a lot. Please note that Tpi and Pi are included in the on-line current data.

A parameter Wbi used to indicate the total number of the additional WIP that required to dispatch from the bottleneck resource is then computed for ith next tool in block 202. In the preferred embodiment, Wbi is calculated by using the definition following:

$$Wbi = 24 \times Bi \times ni - (Tji - Ti) \times Pi - Wwi \qquad \text{(Equation 2)}$$

wherein Bi indicates the batch size of the ith next tool (i.e. the number of the lot that a tool can process once); Ti indicates a next time interval for simulating to allocate the bottleneck resource to the ith next tool; and, ni indicates the available number of the ith next tool; and Wwi indicates the number of the WIP that are ready for processed by the ith next tool. Please note that Wwi, Bi, and ni can be obtained from the on-line current data.

As noted, it is possible that not all the next tools require additional WIP from the bottleneck resource. Thus, the value of Wbi can be applied to determine whether the ith next tool requires additional WIP from the bottleneck resource or not (block 203). When Wbi is a negative numerical value, it indicates that it is unnecessary for the bottleneck resource to dispatch any WIP to the ith next tool. On the other hand, the ith next tool cannot obtain WIP more than a number that are ready to be assigned to the bottleneck resource (Wci). Otherwise, the loading of the bottleneck resource will be significantly upgraded. Accordingly, Wbi must be constrained in a range following:

$$0 \leq Wbi \leq Wci \qquad \text{(Equation 3)}$$

Based on the aforementioned constraints, two parameters Wbi' and Wbi' can be defined as following in the block 103:

$$Wbi' = \max[0, Wbi] \qquad \text{(Equation 4)}$$

$$Wbi'' = \min[Wbi', Wci] \qquad \text{(Equation 5)}$$

Wherein Wbi' can be used to indicate a required total number of the additional WIP dispatched from the bottleneck resource. Therefore, Wbi' can be employed to decide whether in the ith next tool requires additional WIP or not. In addition, Wbi" can be employed as a parameter for determining the WIP number that the bottleneck resource can provide and dispatch to the ith next is tool. In other words, the bottleneck resource only can provide Wbi" WIP to ith next tool in the specific time period.

The bottleneck resource can thus be adjusted in the block 103 by using the derived parameters and in accordance with the following equation:

$$Ni = (Wbi'' / \Sigma Wbi'') \times N \qquad \text{(Equation 6)}$$

Wherein Ni indicates the total number of bottleneck tools allocated to the ith next tool, and N indicates the available number of the bottleneck tools.

An example of the semiconductor fab is employed to give more explanations for the above operations. Please turn to FIG. 3, which shows a table that listing the all the downloaded and computed parameters mentioned above. In the FIG. 3, 6 PEOX machines are the bottleneck resource (N=6), and SACVD, COATER, RTP, PHOTO machines are the next tools. In the example, there are 8 SACVD machines, 5 COATER machines, 3 RTP machines, 4 PHOTO machines, and batch sizes of all the next tools are 1. Furthermore, Wwi, Wci, Tpi, and Pi also can be obtained from the above machines. Therefore, Ni, Pi, Bi, Tpi, Wwi, Wci, and N can be downloaded in the block 101.

The above parameters Tji, Wbi, Wbi', Wbi" and Ni are computed in the block 102. In other word, Tji will be obtained in the block 201 by using (Equation 1); Wbi can be derived from (Equation 2) in the block 202; Wbi' and Wbi" can be derived by using the (Equation 4) and (Equation 5) in the block 203, respectively.

Moreover, Wb3' and Wb4' will be set to 0 because the computed Wb3 and Wb4 are negative values (−32 and −47 respectively). In addition, the Wb1" is set to be 62 because the SACVD machines only require 62 WIP (although 308 WIP are currently processed in the PEOX machines and assigned to dispatch to the SACVD machines) in the specific time period. It is unnecessary to dispatch more than 62 WIP to the SACVD machines because the loading of the PEOX machines will be upgraded. Similarly, Wb2' (214) and Wb2" (168) can be derived from (Equation 4) and (Equation 5), respectively. As noted again, Wb2' is 168 but 214 (Wb2') because the PEOX machines only can provide 168 WIP (Wc2) to the COATER machines. Finally, Ni can be computed by using (Equation 6) in the block 103. Accordingly, 4 (N1) and 2 (N2) of the PEOX machines are allocated to the SACVD and COATER machines, and none of the PEOX machines are allocated to the RTP and PHOTO machines based on (Equation 6). It indicates that the RTP and PHOTO machines do not need additional WIP from the PEOX machines. Therefore, the WIP can be allocated in accordance with the minimum lost time and maximum total moves. The allocation efficiencies of the bottleneck resource can be significantly upgraded, which implies the manufacturing cost will be significantly degraded.

On the other hand, the method disclosed in the invention also can be used to allocate the general resources but only the bottleneck resources. Thus, the allocations of all the resources can follow the method disclosed in the invention. Furthermore, it is convenient for the supervisor to monitor the dispatching situations because the supervisor can dynamically allocate the resources especially when an abnormal allocation situation occurs.

In conclusion, the present invention discloses a method for dynamically allocating the bottleneck resources by increasing the total moves and reducing the lost time for all tools next to the bottleneck resources. Even the allocation of the general resources still can follow the steps of the disclosed method. The supervisor can conveniently and dynamically allocate all the resources when he wants to monitor the dispatching situations, especially when an abnormal situation occurs.

As is understood by a person skilled in the art, the foregoing preferred embodiments of the present invention are illustrated of the present invention rather than limiting of the present invention. It is intended to cover various modifications and similar arrangements such as applying the disclosed method in the general resources still included within the spirit and scope of the appended claims, the scope of which should be accorded the broadest interpretation so as to encompass all such modifications and similar structure.

What is claimed is:

1. An allocating method for allocating resource tools to plural kinds of next tools in a factory, which comprises:

obtaining current data from the resource tools and each kind of the next tools;

determining a plurality of remaining process times, Tji, respectively corresponding to the kinds of the next tools according to the current data;

determining a plurality of first numbers, Wbi, according to the remaining process times correspondingly for a next time interval, Ti, each of the first numbers represents a total number of working-in-process (WIP) lots required to be correspondingly dispatched from the source tools to the kinds of the next tools;

determining a plurality of second numbers, Wbi", according to the first number correspondingly, each of the second numbers represents a total number of the WIP lots that can be correspondingly dispatched from the resource tools to the kinds of the next tools;

determining a plurality of third numbers, Ni, according to the second number correspondingly, each of the third number is equal to an available total number, N, of the resource tools multiply a fraction number, Wbi"/ΣWbi", of the corresponding second number; and allocating the resource tools to the kinds of the next tools according to the third numbers, Ni, correspondingly.

2. The allocating method of claim 1, wherein the current data comprises: the available total number, N, of the resource tools;
- a plurality of average throughputs, Pi, of the kinds of the next tools, and each of the average throughputs is corresponding to the each kind of the next tools;
- a plurality of average process times, Tbi, of the kinds of the next tools, and each of average process times is corresponding to the each kind of the next tools;
- a plurality of batch sizes, Bi, of the kinds of the next tools, and each of the batch sizes is corresponding to the each kind of the next tools;
- a plurality of available numbers, ni, of the kinds of the next tools, and each of the available numbers is corresponding to the each kind of the next tools;
- a plurality of total numbers, Wwi, of WIP lots being ready for running on the kinds of the next tools, and each of the total number of WIP lots is corresponding to the each kind of the next tools; and
- a total number, Wci, of WIP lots being ready for running on the resource tools.

3. The allocating method of claim 2, wherein each of the remaining process times, Tji, is calculated by the following equation:

$$Tji=(24/Pi)-Tpi.$$

4. The allocating method of claim 2, wherein each of the first number, Wbi, is calculated by the following equation:

$$Wbi=24 \times Bi \times ni-(Tji-Ti) \times Pi-Wwi.$$

5. The allocating method of claim 2, wherein each of the second number, Wbi", is calculated by the following equation:

$$Wbi"=\min[\max[0, Wbi], Wci].$$

6. The allocating method of claim 1, wherein the current data is on-line downloaded from the factory.

7. The allocating method of claim 1, wherein the resource tools are bottleneck resource tools.

8. The allocating method of claim 1, wherein the resource tools are general resource tools.

* * * * *